United States Patent

[11] 3,616,941

| [72] | Inventor | James Bernard Walling<br>Houston, Tex. |
|---|---|---|
| [21] | Appl. No. | 868,541 |
| [22] | Filed | Oct. 22, 1969 |
| [45] | Patented | Nov. 2, 1971 |
| [73] | Assignee | Byron Jackson Inc.<br>Long Beach, Calif. |

[54] DUAL HORIZONTAL RACK
9 Claims, 13 Drawing Figs.

[52] U.S. Cl. .................................................. 214/1 PB,
211/60 S, 214/10.5, 214/2.5
[51] Int. Cl. .................................................. B65g 1/10
[50] Field of Search .......................... 214/2.5, 1,
10.5 R, 1 P, 1 PB; 211/60 S, 60 R, 1.5

[56] References Cited
UNITED STATES PATENTS
1,298,578   3/1919   Schneider.................... 214/10.5 R X
1,729,181   9/1929   Neilson ........................ 211/60 S FOREIGN PATENTS
851,768   10/1960   Great Britain................. 214/10.5 R

*Primary Examiner*—Gerald M. Forlenza
*Assistant Examiner*—Frank E. Werner
*Attorneys*—Donald W. Banner, William S. McCurry and John W. Butcher ABSTRACT: A horizontal rack for the racking of stands of well pipe wherein a plurality of pairs of horizontally extended and laterally spaced rack beams are provided for supporting layers of pipe; and included in each pair of beams is a pipe loading beam and a pipe unloading beam, the pipe loading beam having a finger pivotally connected thereto for movement between an out-of-the-way position and a projected position adapted to receive a pipe and guide the same onto the beam, and the pipe unloading beam including a finger normally disposed in an out-of-the-way position and automatically movable to a pipe supporting position as a stand of pipe is moved from the beam.

PATENTED NOV 2 1971 3,616,941
SHEET 1 OF 6
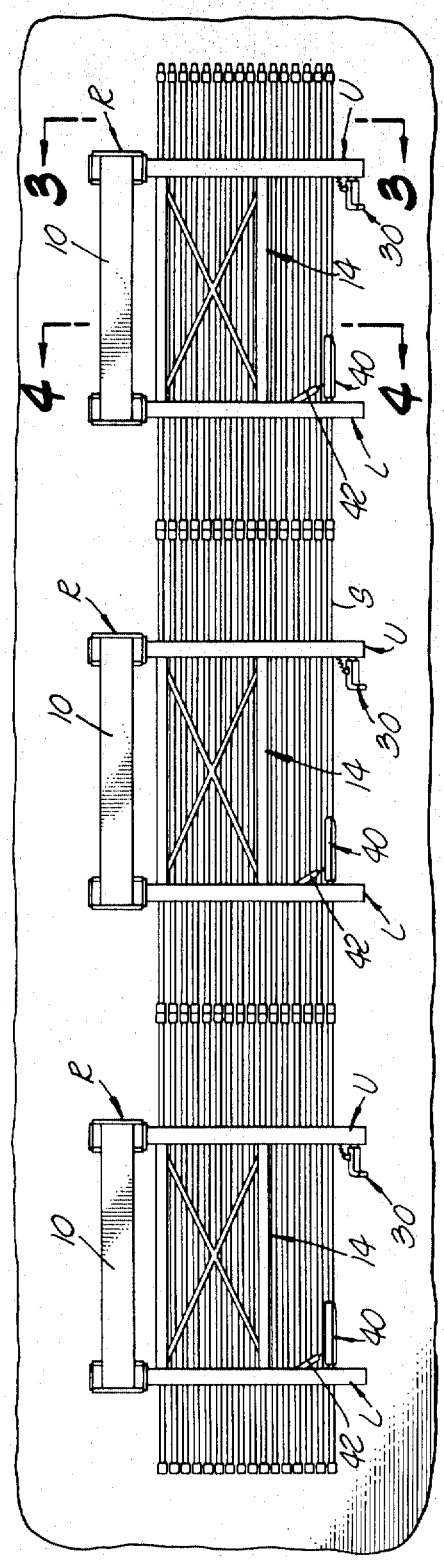
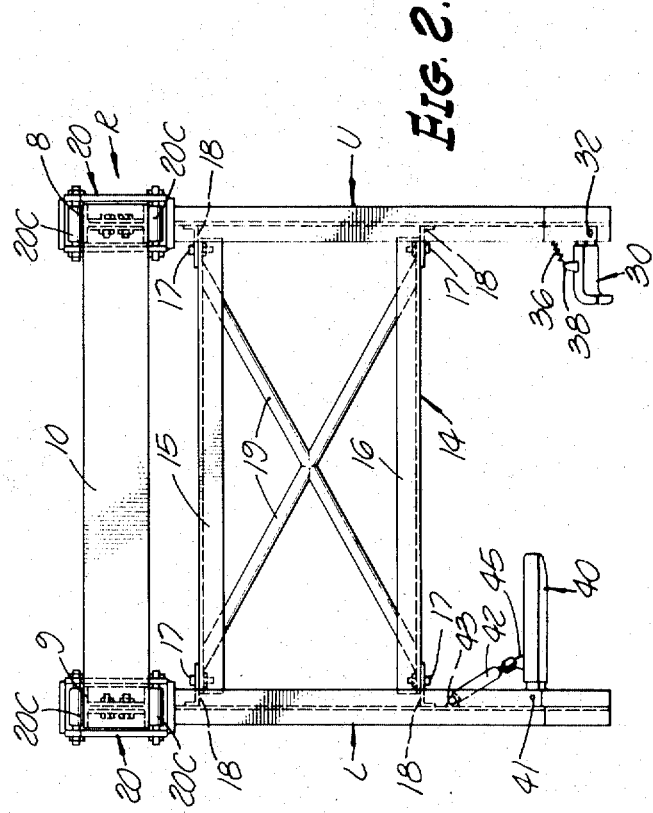
INVENTOR
JAMES BERNARD WALLING
BY John O. Evans, Jr.
ATTORNEY INVENTOR
JAMES BERNARD WALLING
BY John O. Evans, Jr.
ATTORNEY

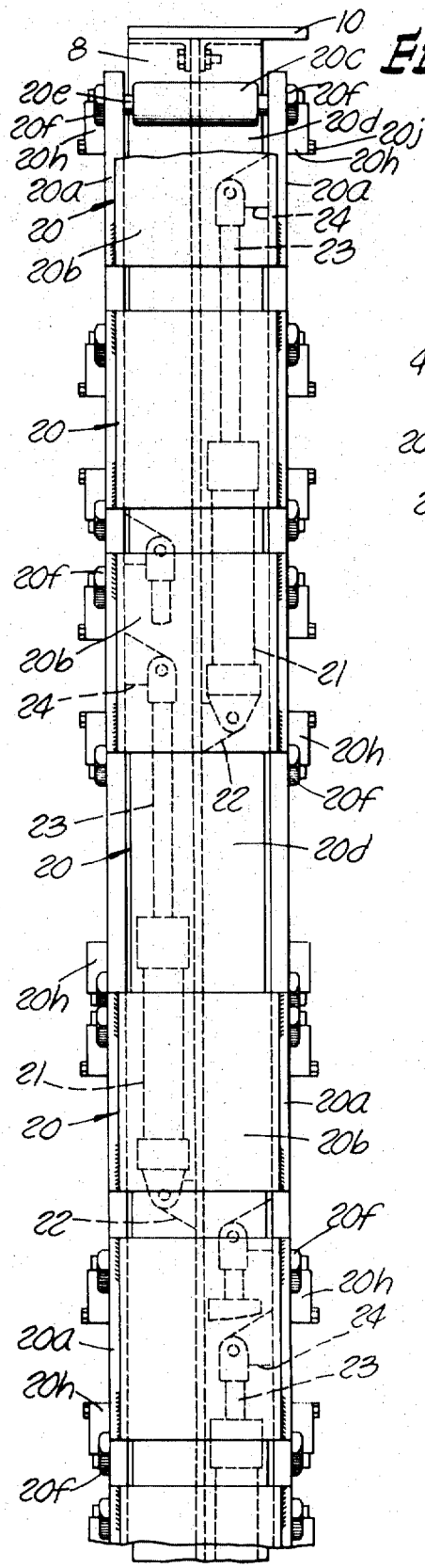
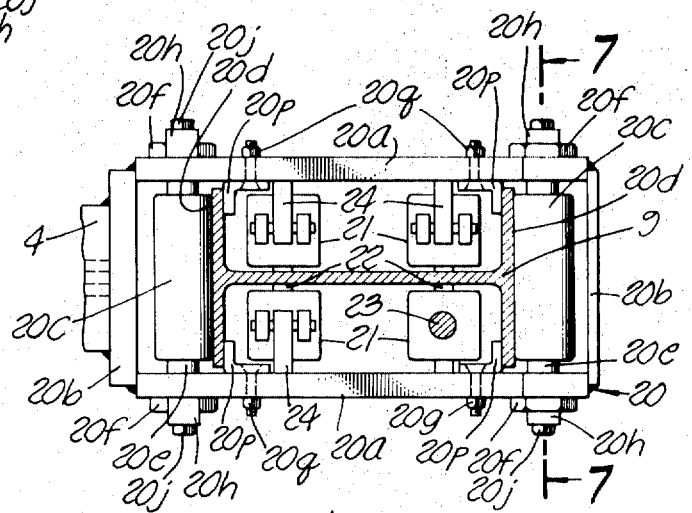
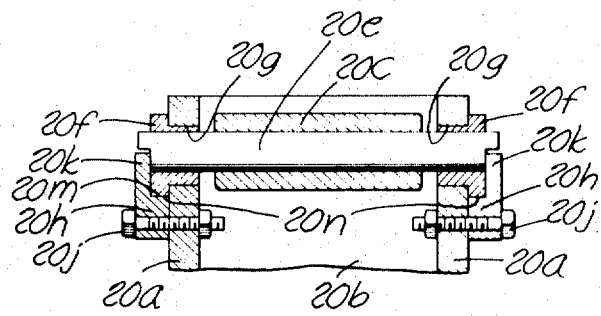

INVENTOR
JAMES BERNARD WALLING
BY John O. Evans, Jr.
ATTORNEY

DUAL HORIZONTAL RACK

BACKGROUND OF THE INVENTION

Pipe racking apparatus for the horizontal racking of stands of pipe have heretofore been provided wherein a plurality of vertically spaced and horizontally extended beams are arranged in side-by-side relation, the beams having pipe spacing elements thereon whereby to retain layers of pipe in predetermined spaced relation on the horizontal beams.

Such pipe racks are adapted for general utility but are primarily useful for the racking of pipe on unstable platforms, such as marine vessels.

An example of such rack apparatus is the HORIZONTAL PIPE RACK disclosed in the application file Oct. 22, 1969, Ser. No. 868,549, in the names of Langowski and Walling. Such prior pipe rack includes fingers at the end of the pipe supporting beams adapted to be projected to pipe supporting positions to support a stand of pipe as the latter is being racked or unracked.

SUMMARY OF THE INVENTION

The present invention involves a horizontal pipe rack which comprises a pair of sets of pipe supporting beams extended horizontally and disposed in side-by-side relation and constituting sets of pipe loading beams and pipe unloading beams, both of which beams operate to support the pipe while it is in racked condition but the loading beams having means thereon useful for guiding pipe automatically onto the beams during the pipe racking operation and the pipe unloading beams having means thereon for automatically supporting the pipe during the pipe unloading operations.

More particularly, the invention provides pipe rack units comprising sets or stacks of pipe loading and unloading beams adapted to be vertically shifted to provide a space on lower beams for the placement of a stand of pipe in a predetermined racked location determined by spacing elements carried beneath the respective beams.

An object of the invention is to provide horizontal pipe racking apparatus which is rugged and durable and which substantially facilitates the racking and unracking of stands of well pipe or the like.

BRIEF DESCRIPTION OF THE DRAWINGS

FIG. 1 is a top plan of a number of pipe rack devices embodying the invention and illustrating a layer of pipe stands supported thereby;

FIG. 2 is an enlarged detail view in top plan illustrating one of the rack units of FIG. 1;

FIG. 5 is a fragmentary view in side elevation and on an enlarged scale of a portion of the pipe rack embraced by the line 5—5 of FIG. 3;

FIG. 6 is an enlarged horizontal sectional view, as taken on the line 6—6 of FIG. 4;

FIG. 7 is a fragmentary detail view in section, as taken on the line 7—7 of FIG. 6;

DESCRIPTION OF THE PREFERRED EMBODIMENT

Figure 3:
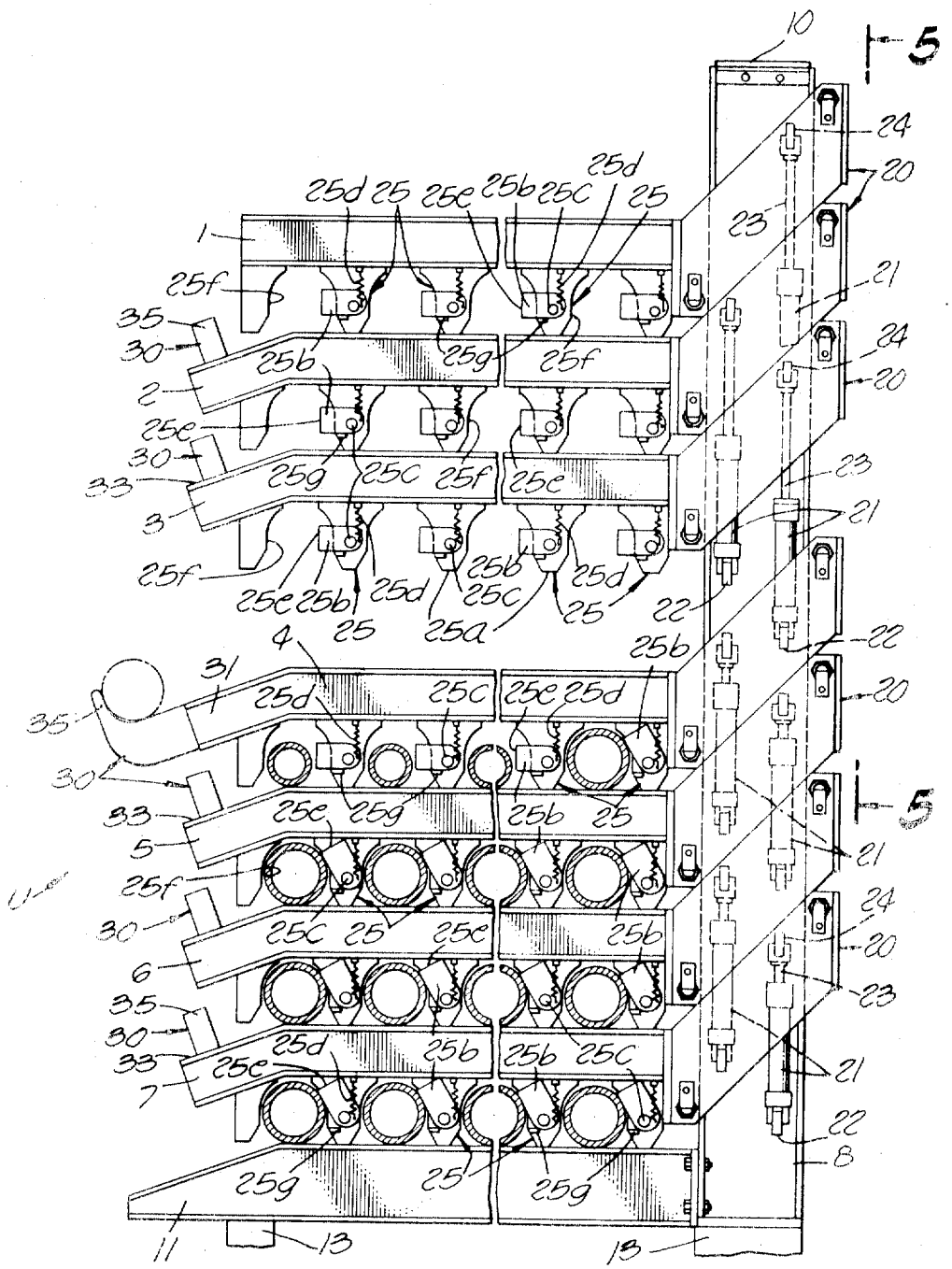
FIG. 3 is an enlarged view in vertical section, as taken on the line 3—3 of FIG. 1.

As seen in the drawings, the rack apparatus of the present invention comprises a rack unit R, three of which are illustrated in FIG. 1 as supporting a layer of pipe stands S. FIG. 2 illustrates one of the units R as including what will be characterized herein as a pipe unloading section U and a pipe loading section L, the unloading section U being more particularly disclosed in FIG. 3 and the loading section L being more particularly disclosed in FIG. 4 as respectively including vertically spaced sets or stacks of horizontally extended supporting beams respectively designated 1 through 7, vertically shiftably disposed upon upright posts 8 and 9. Upright posts 8 and 9 are joined at their upper ends by a header 10 and it will be understood may also be joined adjacent their lower ends by a similar crossmember (not shown). Below the lowermost rack beams 7 of the pipe unloading and loading sections U and L, respectively, are what may be termed transoms 11 and 12 extended horizontally beneath the beams 7 and suitably joined to the posts 8 and 9, the transoms 11 and 12 bridging suitable substructure generally denoted at 13 adapted to be supported on a suitable base such as the deck of a drilling vessel.

Means 14 are provided for rigidly interconnecting each of the horizontally spaced pairs of support beams 1 through 7. An illustrative means 14 is shown in FIG. 2 as including a pair of opposed parallel structural members 15 and 16 which are suitable attached as by fasteners 17 to brackets 18 which are welded or otherwise suitably connected to the horizontal spaced beams 1 through 7 respectively. Suitable crossbracing 19 may also be provided, all as best seen in FIG. 2. Each of the beams 1 through 7 of the respective pipe unloading section U and the pipe loading section L of the rack unit is vertically shiftably supported on the posts 8 and 9 by a hollow support generally denoted at 20.

Referring to FIGS. 3 through 7, it will be noted that the posts 8 and 9 are rectangular in form and may be composed of an I-beam and that the sleeves or hollow supports 20 are correspondingly constructed in generally rectangular form. More particularly, the supports 20 each comprise (see FIG. 6) opposing sidewalls 20a interconnected by end walls 20b which are welded or otherwise suitably joined with the sidewalls 20a. Roller means are provided for minimizing the friction between the sleeves or supports 20 and the posts 8 and 9, and, accordingly, opposing rollers 20c are provided between the sidewalls 20a of the supports 20 and the posts 8 and 9 for rolling engagement with the opposing sides 20d of the I-beam posts 8 and 9. As best seen in FIGS. 6 and 7, the rollers 20c are mounted on shafts 20e which extend through eccentric bushings 20f revolvable in openings 20g in the support sidewalls 20a so as to adjust the relationship between the rollers 20c and the posts 8 and 9. The shafts 20e may be secured in the sidewalls 20a and held in adjusted positions by means of retainer members 20h which are secured to the sidewalls 20a by fasteners 20j and have tongues 20k extended into overlying relationship with the ends of the shafts 20e and flat surfaces 20m which engage flats on the hexagonal portion 20n of the bushings 20f.

Figure 4:
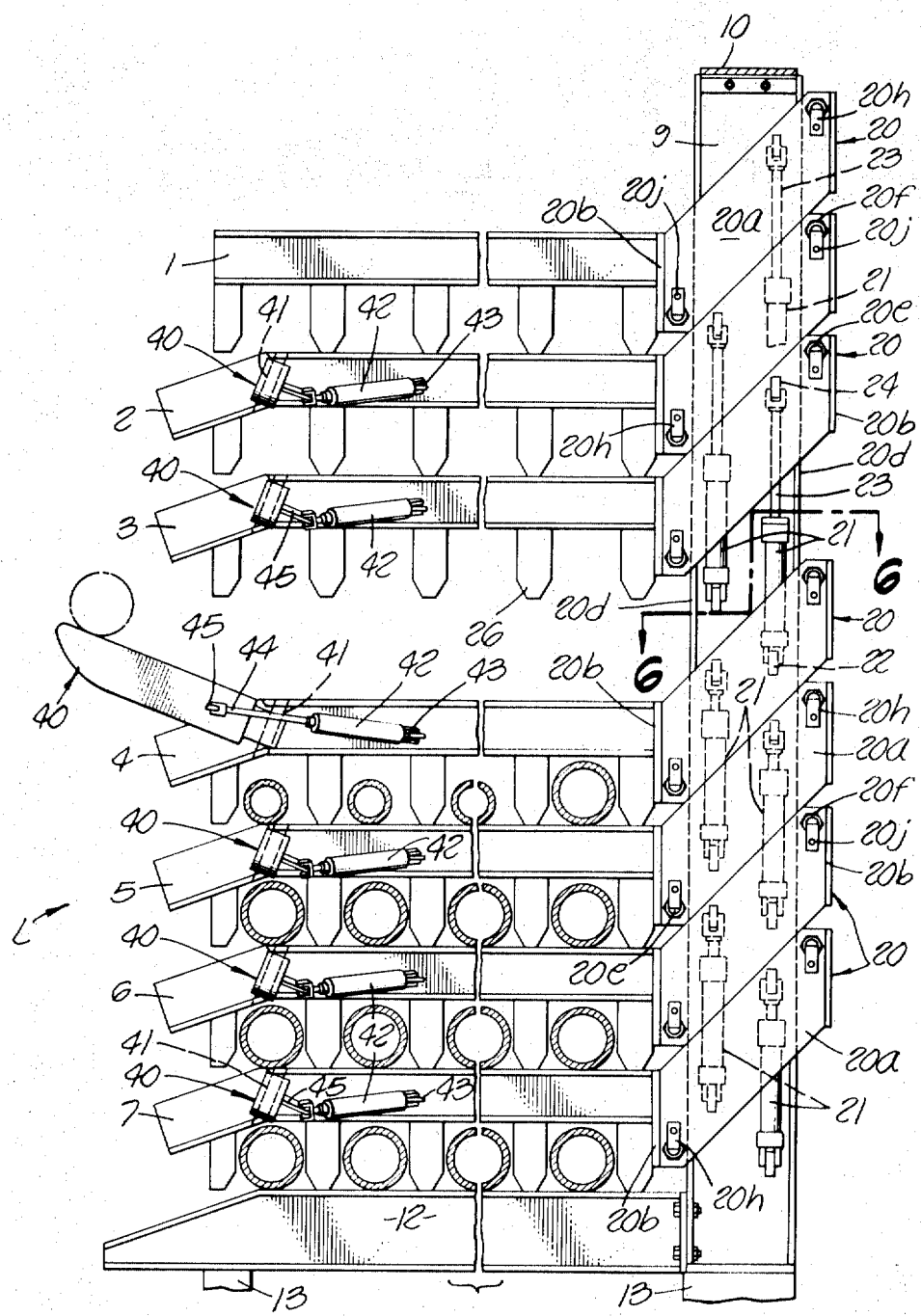
FIG. 4 is an enlarged view in vertical section, as taken on the line 4—4 of FIG. 1.

These rollers 20c are so located as to support the respective rack beams 1 through 7 in the desired horizontal position; therefore, one of the rollers 20c is located at the opposite side of the post 8 or 9 from the respective beams and at a location elevated with respect to the other roller 20c. The sidewalls 20a of the supports 20 are cut away at angles so as to closely nest one of the other, as best seen in FIGS. 3 and 4. Internally of the respective supports 20 they may be provided with opposing guide brackets 20p supported on the respective sidewalls 20a by fasteners 20q in opposing relation to one of the rollers 20c.

For purposes of effecting successive elevation of the sets of rack beams 1 through 7, hydraulic actuators are provided, in the illustrative embodiment, acting on each of the support members 20 of a pair of the unloading and loading beams 1 through 7, respectively, such actuators respectively being designated 21. The actuators 21 are vertically disposed within the spaces defined by the I-beam posts 9 and may be alternately located at opposite sides of the posts. Each of these actuators 21 is interconnected with one of the posts 9 by a suitable bracket or ear 22, and each such actuator includes an extensible operating rod 23 connected to its beam supporting sleeve 20 by a bracket or ear 24 welded or otherwise suitably provided within the respective supports 20. Thus it will be apparent that each of the rack arms 1 through 7 in both the pipe unloading rack section U and the pipe loading rack section L is adapted to be individually elevated by the actuator cylinders 21 during the racking and unracking of pipe stands. In this connection, as seen in FIGS. 3 and 4, the beams 1 through 7 are successively elevated to free a layer of pipe stands on the beam therebelow for movement of the pipe stands to and from the racked positions. In the practical utilization of the subject rack, suitable conveyor means may be employed to successively feed the pipe stands to and from the racked positions. An example of such a pipe feeder conveyor is illustrated more particularly in the application for PIPE RACKING APPARATUS, filed Oct. 22, 1969, Ser. No. 868,550, in the names of Walling and Van Wormer.

In order to maintain the pipe stands in predetermined spaced positions on the beams 1 through 7, spacer means are provided. In the illustrative embodiment the spacer means on the pipe unloading beams 1 through 7, as seen in FIG. 3, comprise downwardly extended spacer elements 25 which are spaced along the underside of each of the beams and suitably affixed thereto. The spacer elements 25 have lower end portions 25a adapted to abut with the upper surface of a subjacent beam so that the weight of the entire rack of pipe is not supported by the pipe itself but instead is progressively supported through the spacers 25 and the rack beams 1 through 7, the full load ultimately being supported by the transoms 11 and 12.

In addition, the present embodiment provides means in combination with the spacers 25 on the unloading beams 1 through 7 whereby the apparatus is adapted for racking pipe of different diameters, such as comparatively large drill collars, on the one hand, and smaller diameter drill pipe, on the other hand. As seen in FIG. 3, the spacers 25 are each provided with an auxiliary spacer dog 25b connected to the respective spacers 25 by means of a suitable pivot bolt 25c. Each of the dogs 25b is normally biased by a tension spring 25d to a horizontally extended position at which the end surface 25e of the dog is opposed to a spacer surface 25f of an adjacent spacer 25 and defines a space smaller than the space defined between the opposing surfaces of the spacers 25 themselves. The difference is clearly illustrated in that a number of smaller diameter pipe strings are supported on the rack beam 5, the dogs 25b being in their normal spring-biased position limited by stops 25g provided on the respective spacers 25, whereby the limit movement of the dogs 25b under the influence of the springs 25d. Also shown on the rack beam 5 is another section of pipe of larger diameter which engages the spacer dog 25b and causes the same to pivot upwardly out of the way, so that the larger diameter section of pipe is confined between the opposing spacers 25.

Similar spacers, if desired, may be employed on the beams 1 through 7 of the loading section L of the rack construction, but in the illustrative embodiment simple spacers 26 are provided beneath the respective loading beams 1 through 7 adapted, as in the case of the spacers 25, to abut with a subjacent beam. The pipe stands are held in the desired positions in the case of the smaller sizes of pipe by the dogs 25b on the unloading rack beams.

Figure 9:
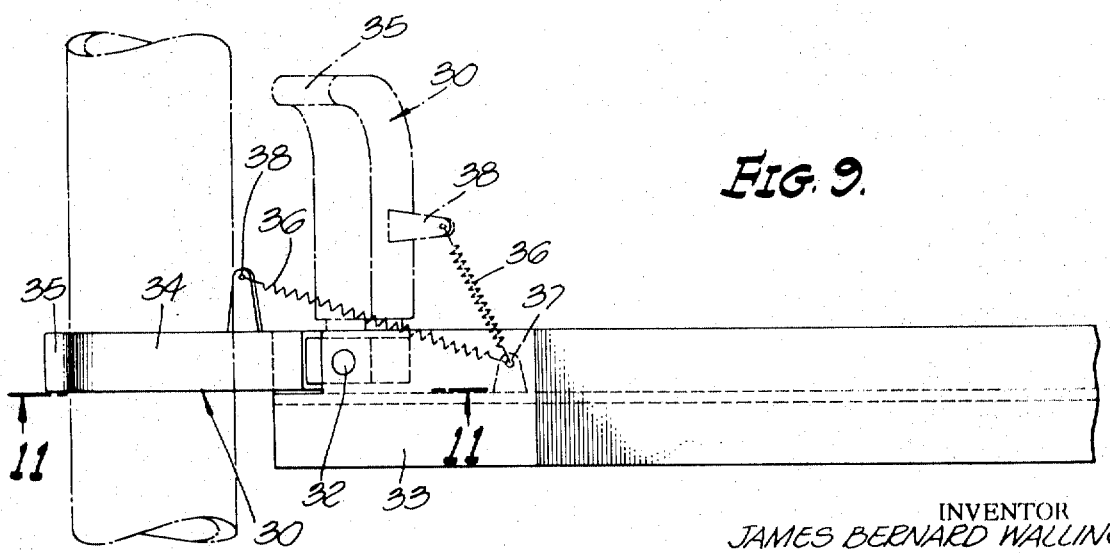
FIG. 9 is a fragmentary detail view in top plan of the outer end of a pipe unloading beam of the pipe racking apparatus.
Figure 11:
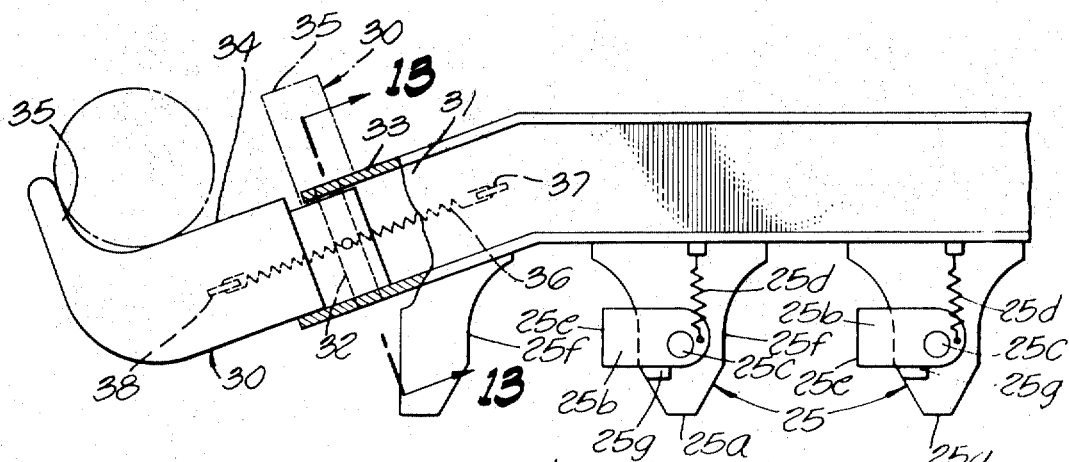
FIG. 11 is a fragmentary detail view in vertical section, as taken on the line 11—11 of FIG. 9.

The unloading rack beams are provided at their outer free ends with what may be characterized as unloading arms respectively designated 30 on each beam, the arms 30 movable between a retracted out-of-the-way position and an outwardly extended unloading position. These unloading arms are best seen in FIGS. 3, 9, and 11, wherein it will be seen that each of the arms 30 is supported by a downwardly extended end portion 31 of the respective beams. Each arm 30 is pivoted on a pivot pin 32, the axis of which is normal to the inclined upper surface 33 of its pipe supporting beam, the arm having an upper surface 34 which, when the arm 30 is in the full line position of FIG. 11, forms an inclined extension of the surface 33 of the beam. At its free end, each arm 30 has an upstanding ear or lug 35 which is adapted to arrest movement of a length of pipe down the inclined surfaces 33 and 34. Spring means are provided, in the illustrative form of a coiled tension spring 36 connected at 37 to the beam and at 38 to the arm 30, so as to normally bias the arm to the broken line retracted position of FIGS. 9 and 11. In this retracted position, however, the ear 35, as clearly seen in FIG. 11 in broken lines, projects upwardly into the path of a length of pipe rolling down the inclined surface 33 so that the length of pipe will engage the ear 35 to effect automatic movement of the arm 30 to the projected position at which the ear 35 will arrest further movement of the pipe.

Figure 8:
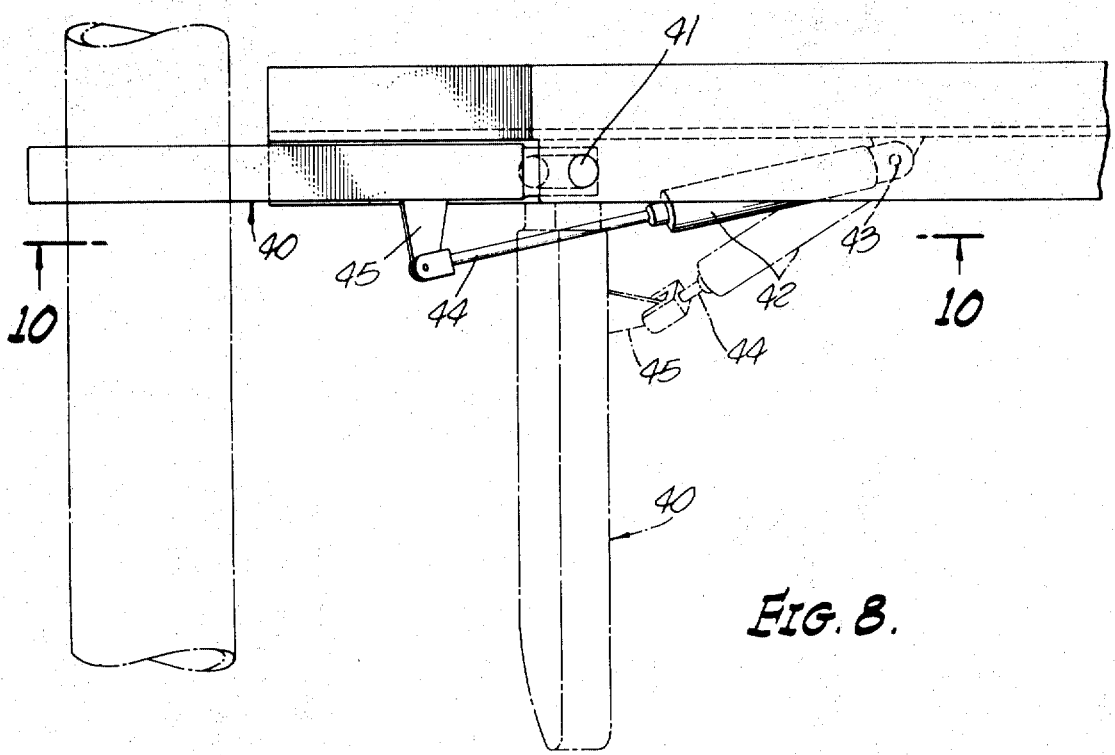
FIG. 8 is a fragmentary detail view in top plan of the outer end of a pipe loading beam of the pipe racking apparatus.
Figure 10:
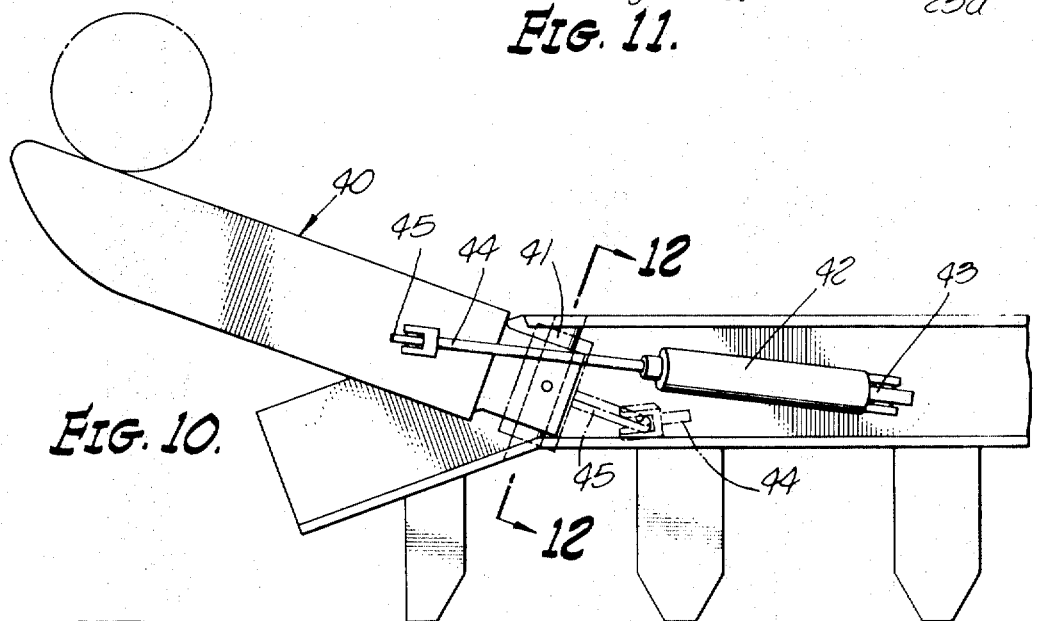
FIG. 10 is a fragmentary detail view in vertical section, as taken on the line 10—10 of FIG. 8.
Figure 12:
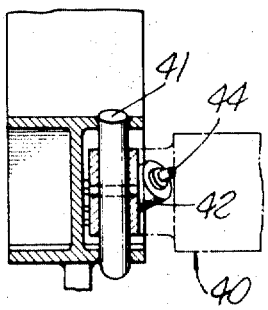
FIG. 12 is a fragmentary detail view in section, as taken on the line 12—12 of FIG. 10.
Figure 13:
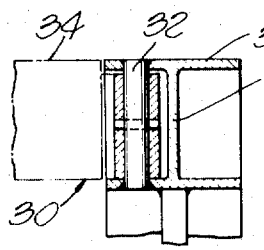
FIG. 13 is a fragmentary detail view in section, as taken on the line 13—13 of FIG. 11.

Referring now to the loading section L of the rack assembly, each of the supporting beams 1 through 7 is seen to have at its outer end a loading arm 40. These loading arms are best illustrated in FIGS. 4, 8 and 10 as being supported on a pivot pin 41, the axis of which is disposed at an angle relative to the plane of the respective pipe supporting beams, whereby the arm 40 is pivotally movable between an upwardly and outwardly extended position and a retracted position at which the arm 40 extends substantially horizontally, as seen in FIG. 4, between the upper and lower surfaces of its supporting beam. In the outwardly and upwardly disposed position, the arms 40 are adapted to receive a length of pipe lowered thereon by suitable transfer apparatus (not shown), and the pipe will gravitate down the inclined arms 40 to the upper pipe supporting surface of the rack beams 1 through 7. In order to effect projection and retraction of the loading arms 40, each of them is provided with actuator means in the form of a fluid pressure actuated cylinder 42 pivotally connected to its beam as at 43 and having an actuator rod 44 projecting therefrom and pivotally connected to an ear 45 on the loading arm 40. Suitable means may be provided for supplying fluid under pressure to the actuator cylinder 42 in order to effect the projection and retraction of the loading arms.

In the usage of the rack of the present invention, as illustrated in FIG. 1, a plurality of the dual rack assemblages comprised of the loading and unloading sections may be arranged in laterally spaced relation, the number of such assemblies depending upon the length of the pipe stands S to be racked thereon.

Assuming that it is desired to unload stands of pipe, as illustrated in FIG. 3, the upper rack beams above the pipe stands on the rack are elevated to free the pipe on one of the beams for movement from racked positions into engagement with the unloading arms 30, the pipe causing the unloading arms to swing outwardly. The transfer apparatus is employed to remove the stands successively from the unloading arms 30 until the entire layer of pipe has been unracked. Thereupon, the unloaded supporting beam will be elevated to free the next layer of pipe for successive unracking.

Conversely, when it is desired to rack pipe, as shown in FIG. 4, the loading arms 40 are moved to the projected position and the transfer apparatus is employed to lower a length of pipe onto the outwardly extended loading arms 40 from which the pipe will gravitate onto the supporting beams. Following the placement of a layer of pipe on a supporting beam its loading arm is retracted; the next superjacent beam is lowered to confine the previously loaded layer of pipe in racked positions; and the loading arm of the last-mentioned beam is moved to its projected position to allow the successive placement of another layer of pipe thereon.

While one embodiment of the dual horizontal pipe rack of the invention has been herein shown and described, changes and alterations may be made without departing from the spirit of the invention.

I claim:

1. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe unloading means includes arms at the free ends of certain of said beams, means shiftably supporting said arms for movement between retracted and projected positions, said arms having means for engagement by said pipe for moving said arms to the projected positions, and means on said arms for removably supporting pipe when said arms are in said projected positions.

2. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe unloading means includes arms at the free ends of certain of said beams, means shiftably supporting said arms for movement between retracted and projected positions, said arms having means for engagement by said pipe for moving said arms to the projected positions, means on said arms for removably supporting pipe when said arms are in said projected positions, and means for automatically retracting said arms upon removal of said pipe therefrom.

3. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe unloading means includes arms at the free ends of certain of said beams, means pivotally mounting each of said rams for movement between retracted and projected positions, each of said arms having an upstanding ear thereon engageable by said pipe for pivoting said arm to the projected position, said free ends of said beams having an inclined upper pipe supporting surface, said arms providing in said projected positions an extension of said surface, and said ear on each of said arms providing means for limiting movement of said pipe down said inclined surface.

4. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe unloading means includes arms at the free ends of certain of said beams, means pivotally mounting each of said arms for movement between retracted and projected positions, each of said arms having an upstanding ear thereon engageable by said pipe for pivoting said arm to the projected position, said free ends of said beams having an inclined upper pipe supporting surface, said arms providing in said projected positions an extension of said surface, said ear on each of said arms providing means for limiting movement of said pipe down said inclined surface, and spring means for returning said arms to the retracted positions upon removal of said pipe.

5. In a a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe loading means includes arms at the free ends of certain of said beams, means shiftably supporting said arms for movement between projected and retracted positions, said arms extending upwardly and outwardly in said projected positions for effecting movement of said pipe onto said beams.

6. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe loading means includes arms at the free ends of certain of said beams, means pivotally mounting said arms for movement between projected and retracted positions, said arms extending upwardly and outwardly in said projected positions for effecting movement of said pipe onto said beams, and including actuator means for shifting said arms between said positions.

7. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on said posts, and pipe loading means and pipe unloading means operatively associated with said beams for respectively directing pipe stands onto said beams and for limiting movement of said pipe stands from said beams, wherein said pipe loading means includes arms at the free ends of certain of said beams, means pivotally mounting said arms for movement between projected and retracted positions, said arms extending upwardly and outwardly in said projected positions for effecting movement of said pipe onto said beams, and including actuator means for shifting said arms between said positions, said actuator means including fluid pressure operated cylinder means interposed between said beams and said arms.

8. In a rack for the horizontal racking of stands of oil well pipe and the like: a pair of vertically extended laterally spaced posts, pipe supporting beams associated with each post and disposed in horizontally extended vertically spaced relation with respect to one another, means supporting one end of said beams for vertical movement on the respective posts, means uniting a beam on one post with a beam on the other post to form a pair of beams movable as a unit, means for effecting elevation and lowering of a pair of unitized beams, one beam of each pair having pipe loading means at its free end for directing stands of pipe onto said beams, and the other beam of each pair having unloading means at its free end for limiting movement of said pipe stands from said beams.

9. A pipe rack as defined in claim 8, wherein said pipe loading means and said pipe unloading means respectively comprise an arm pivotally mounted at the free end of its beam and movable between projected and retracted positions, said loading arm extending upwardly and outwardly in the projected position and said unloading arm extending downwardly and outwardly in the projected position, said unloading arm having means thereon engageable by a pipe stand for shifting the same to said projected position.

* * * * *